(12) United States Patent
Geisler

(10) Patent No.: US 9,709,446 B2
(45) Date of Patent: Jul. 18, 2017

(54) MODULE FOR INTEGRATION INTO A MOBILE TERMINAL TO MEASURE THE AMBIENT TEMPERATURE

(71) Applicant: Robert Bosch GmbH, Stuttgart (DE)

(72) Inventor: Dominik Geisler, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 365 days.

(21) Appl. No.: 14/313,224

(22) Filed: Jun. 24, 2014

(65) Prior Publication Data
US 2014/0376591 A1 Dec. 25, 2014

(30) Foreign Application Priority Data
Jun. 25, 2013 (DE) .................. 10 2013 212 066

(51) Int. Cl.
| | | |
|---|---|---|
| G01K 3/14 | (2006.01) | |
| G01K 1/16 | (2006.01) | |
| G01K 13/00 | (2006.01) | |
| G01K 7/01 | (2006.01) | |
| G01K 7/42 | (2006.01) | |

(52) U.S. Cl.
CPC .............. *G01K 7/01* (2013.01); *G01K 7/427* (2013.01)

(58) Field of Classification Search
CPC G01K 17/00; G01K 3/03; G01K 3/14; G01K 1/16; G01K 13/00
See application file for complete search history.

(56) References Cited

U.S. PATENT DOCUMENTS

| | | | | |
|---|---|---|---|---|
| 5,188,286 A | * | 2/1993 | Pence, IV | G05D 23/27535 236/1 F |
| 5,281,025 A | * | 1/1994 | Cali | B23K 3/0478 324/511 |
| 7,933,637 B2 | * | 4/2011 | Gammon | H04M 1/035 381/355 |
| 7,942,825 B2 | * | 5/2011 | Ranganathan | A61B 5/01 374/107 |
| 8,987,880 B2 | * | 3/2015 | Hoeglauer | H01L 23/49513 257/502 |
| 9,031,066 B2 | * | 5/2015 | Hong | H04W 88/02 370/388 |
| 2002/0002683 A1 | * | 1/2002 | Benson | G06F 21/86 713/194 |
| 2004/0000713 A1 | * | 1/2004 | Yamashita | A61B 5/0002 257/728 |

(Continued)

FOREIGN PATENT DOCUMENTS

| | | | | |
|---|---|---|---|---|
| AU | 2011363802 A1 | * | 11/2012 | .......... H04M 1/0283 |
| CN | 101917515 A | * | 12/2010 | |

(Continued)

*Primary Examiner* — Gail Kaplan Verbitsky
(74) *Attorney, Agent, or Firm* — Norton Rose Fulbright US LLP; Gerard Messina

(57) ABSTRACT

A module for integration into a mobile terminal, in order to estimate the ambient temperature, includes: a first device for measuring a first temperature in the first region; a second device for measuring a second temperature in a second region; and an evaluation device configured to ascertain a temperature difference between the first temperature in the first region and the second temperature in the second region, in order to estimate the ambient temperature.

7 Claims, 2 Drawing Sheets

(56) References Cited

U.S. PATENT DOCUMENTS

| | | | |
|---|---|---|---|
| 2006/0203879 A1* | 9/2006 | Ruttiger | B60H 1/00785 374/142 |
| 2011/0119018 A1* | 5/2011 | Skarp | G01K 7/42 702/130 |
| 2013/0062722 A1* | 3/2013 | Hoeglauer | H01L 23/49513 257/467 |
| 2014/0266269 A1* | 9/2014 | Ausserlechner | G01R 1/203 324/713 |
| 2014/0328367 A1* | 11/2014 | Niederberger | G01K 1/20 374/1 |
| 2015/0063402 A1* | 3/2015 | Geisler | G01K 13/00 374/1 |

FOREIGN PATENT DOCUMENTS

| | | | |
|---|---|---|---|
| CN | 102984366 A | * | 3/2013 |
| CN | 105509235 A | * | 4/2016 |
| EP | 1 301 014 | | 4/2003 |
| KR | 2005114978 A | * | 12/2005 |
| KR | 20060113026 A | * | 11/2006 |

* cited by examiner

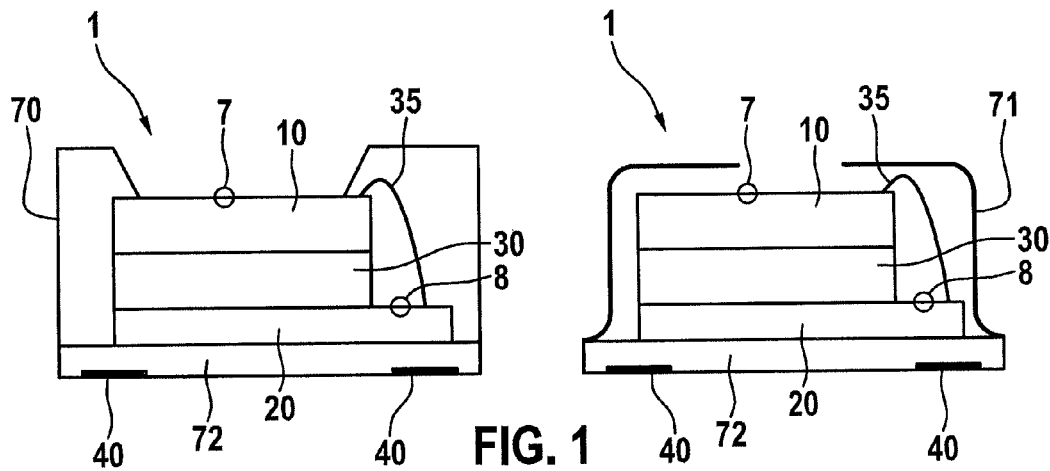
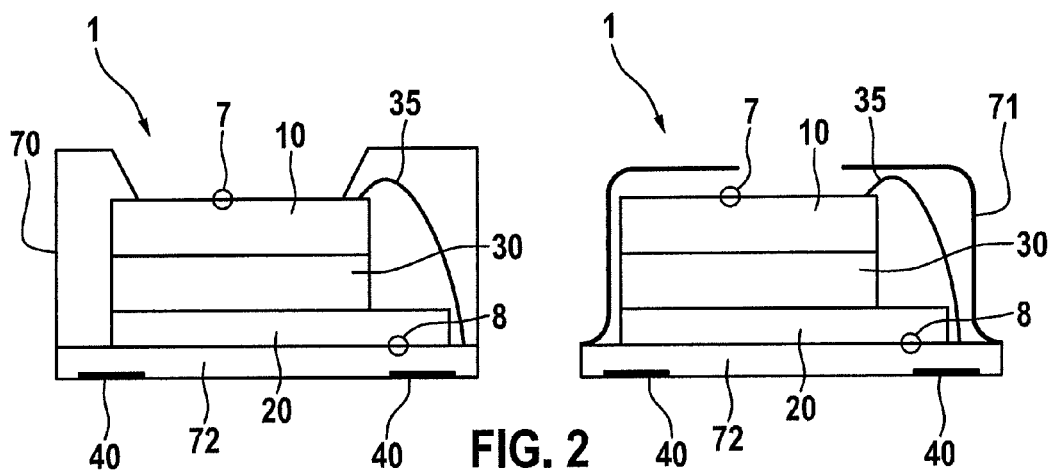
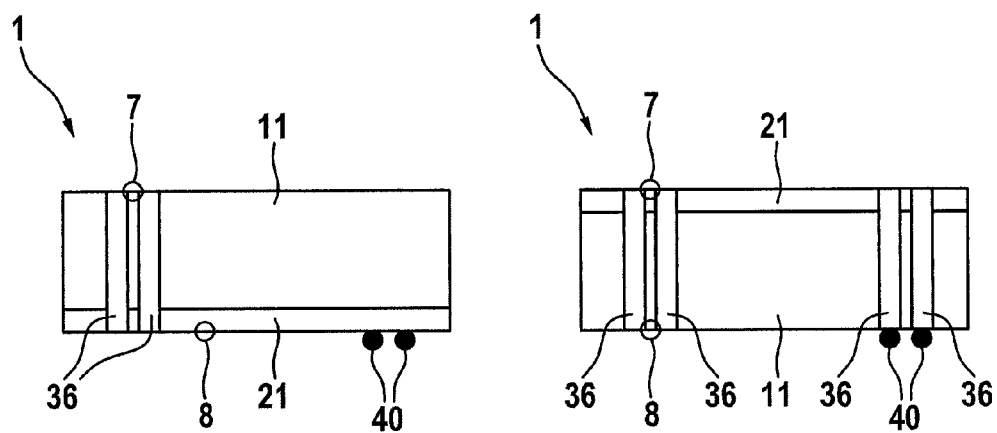
FIG. 1
FIG. 2
FIG. 3

MODULE FOR INTEGRATION INTO A MOBILE TERMINAL TO MEASURE THE AMBIENT TEMPERATURE

BACKGROUND OF THE INVENTION

1. Field of the Invention

The present invention relates to a module for integration into a mobile terminal, in order to estimate the temperature of the surroundings of the mobile terminal.

2. Description of the Related Art

The temperature of the surroundings of a mobile terminal may only be determined with limited accuracy, using a temperature sensor situated on the mobile terminal, since the specific heat and/or the self-heating and the thermal inertia of the mobile terminal falsifies the direct measurement of the ambient temperature. A method, according to which the temperature difference between two temperature sensors situated at different locations within the mobile terminal, is used for estimating the temperature of the surroundings of the mobile terminal, is known from published European patent application document EP 1 301 014 A1. In this context, as a rule, the temperature sensors measure different temperatures, since further components or assemblies of the mobile terminals form heat sources through their operation, which cause the temperature to change over the extension of the mobile terminal. In addition, the various components have different heat capacities, which produce different response rates; and they are thermally linked to the environment to different extents, which produces different final temperatures. For example, as a rule, a temperature sensor situated in the interior of the mobile terminal will have a higher temperature than a temperature sensor that is situated on a housing of a mobile terminal. The ambient temperature may then be estimated in light of the temperature difference between the two temperature sensors. In this context, a requirement for accurately estimating the ambient temperature is careful calibration, that is, modeling the thermal behavior of the entire mobile terminal. Since, as a rule, the temperature sensors are mounted at different locations in the mobile terminal, one would have to provide careful calibration of each individual device, specific to device type, in a costly and time-consuming manner. Therefore, considering the number of different types of devices, the calibration is expensive and time-consuming.

The object of the present invention is to provide a device, by which the temperature of the surroundings of a mobile terminal may be ascertained in as accurate a manner as possible, and in which the expenditure for calibration is simultaneously limited.

BRIEF SUMMARY OF THE INVENTION

The present invention provides a module, which may be integrated into a mobile terminal and used for estimating the ambient temperature. Not only cellular phones or tablets, but also MP3 players, USB sticks and notebooks are understood to be a mobile terminal. According to the present invention, it is provided that the module include a first device for measuring temperature and a second device for measuring temperature. In this context, the first device for measuring temperature and the second device for measuring temperature may be, for example, a temperature diode or a temperature-dependent resistor or another temperature-sensitive electrical component. While a first temperature in a first region may be measured by the first device for measuring temperature, the present invention allows a second temperature in a second region to be measured by the second device for measuring temperature. In addition, the module of the present invention includes an evaluation device; the evaluation device being configured in such a manner, that a temperature difference between the first temperature in the first region and the second temperature in the second region, which is necessary for estimating the ambient temperature, is ascertainable. In this context, in the module, it is conceivable, in each instance, for a first measured variable proportional to the first temperature and a second measured variable proportional to the second temperature to be transmittable to the evaluation device. However, it is also conceivable for a third measured variable directly proportional to the temperature difference to be transmittable to the evaluation device. The module is preferably mounted to the device housing of the mobile terminal.

The module of the present invention has the advantage that it may be flexibly built into a multitude of mobile terminals. In this manner, it is advantageously possible to limit the calibration essentially to the module and to reduce the time and expense of the calibrations specific to the type of device.

In one particularly advantageous specific embodiment, the evaluation device is additionally configured in such a manner, that the estimation of the ambient temperature is ascertainable as a function of the temperature difference. It is generally provided that the module communicate, that is, exchange data, with the rest of the mobile terminal via an interface. In this context, it is conceivable, for example, for the temperature difference to be transmittable to the mobile terminal via the interface, and for a processor of the mobile terminal to be provided for estimating the ambient temperature. In the preferred specific embodiment, the ambient temperature is estimated directly in the evaluation device. In this manner, the mobile terminal and the module remain independent of one another, which means that additional adaptations of the mobile terminal to the module are advantageously unnecessary.

In one particularly preferred specific embodiment, it is provided that the evaluation device be situated in the second region. In this manner, it is advantageously possible to manufacture the module to be particularly compact and space-saving. In addition, in this specific embodiment, it is only necessary to transmit one signal, e.g., the first measured value. This advantageously reduces the expenditure for constructing the module.

In a further specific embodiment, the first region and the second region are interconnected via an electrically conductive connection.

In a further specific embodiment, it is provided that a separating region be situated between the first device for measuring temperature and the second device for measuring temperature. The distance between the first region and the second region may be advantageously changed by varying the thickness of the separating region. For example, it is conceivable for the distance to be selected to be small, when a module, which is as compact as possible and dimensioned to be small, is desired. It is also conceivable for the temperature difference to become larger and, therefore, conceivable for one to be able to work with smaller proportionality factors, by increasing the distance between the first and the second regions, which means that as a rule, the estimation of the ambient temperature is improved. In addition, it is conceivable for the separating region to be used for screening off the heat, which means that the temperature difference may possibly be increased.

In a further specific embodiment, it is provided that the separating region be formed by an adhesive or a conductive adhesive. In this manner, the first temperature sensor, the second temperature sensor and the evaluation device are advantageously interconnected over as large an area as possible. The large-area connecting also increases the strength of the connection of the first temperature sensor, second temperature sensor and the evaluation device in comparison with a smaller-area connection.

In a further specific embodiment, the first region and the second region are situated on opposite sides of the module. In this manner, it is advantageously possible to define points situated furthest away from another as the first and second regions. In the case of such a selection, it is to be expected that the largest temperature difference between the first and the second regions will be advantageously achieved.

In a further specific embodiment, it is provided that a further evaluation device be situated in the first region. In this manner, the first temperature may be determined directly in the further evaluation device in an advantageous manner, and a fourth measured variable may be transmitted to the evaluation device in the first region. In particular, it is also conceivable for both the evaluation device and the further evaluation device to be able to ascertain the temperature difference and/or estimate the ambient temperature. Then, if one evaluation device fails, the module would advantageously still function.

In one further specific embodiment, it is provided that the electrically conductive connection be produced by a bonding wire or an electrical contact. The use of a bonding wire allows the end sections of the bonding wire to be positioned flexibly on the surface of the module, which means that the first region may be advantageously situated as far away from the second region as possible. By using through-hole plating, the additional required space of a bonding wire may be advantageously eliminated, and a module, which is as compact as possible, may be provided.

In a further specific embodiment, the first device for measuring temperature includes a temperature-dependent resistor and/or a temperature-measuring diode and/or another temperature-sensitive electrical component, and/or the second device for measuring temperature includes a temperature-dependent resistor and/or a temperature-measuring diode and/or another temperature-sensitive electrical component. In particular, components, which may be integrated into a microdevice, are used. In this manner, the component may advantageously be dimensioned to be as small as possible.

In a further specific embodiment, it is provided that the module include a housing. Such a housing may be used for shielding all of the components of the module or a portion of the components of the module; the object of the shielding being to reduce the amount of heat per unit time transmitted by components of the mobile terminal to the module. In addition, the housing protects the first device for measuring temperature, the second device for measuring temperature, in particular, the bonding wires, and the evaluation device, from damage.

Further details, features and advantages of the present invention are derived from the drawing, as well as from the following description of preferred specific embodiments, in light of the drawing. In this context, the drawing only illustrates exemplary specific embodiments of the present invention, which do not limit the essential inventive idea.

BRIEF DESCRIPTION OF THE DRAWINGS

FIG. 1 shows a first and a second specific embodiment of a module of the present invention, including a molded housing and a metal housing, respectively.

FIG. 2 shows a third and fourth specific embodiment of a module of the present invention, including a molded housing and a metal housing, respectively.

FIG. 3 shows a fifth specific embodiment and sixth specific embodiment of a module according to the present invention.

DETAILED DESCRIPTION OF THE INVENTION

Figure 4:
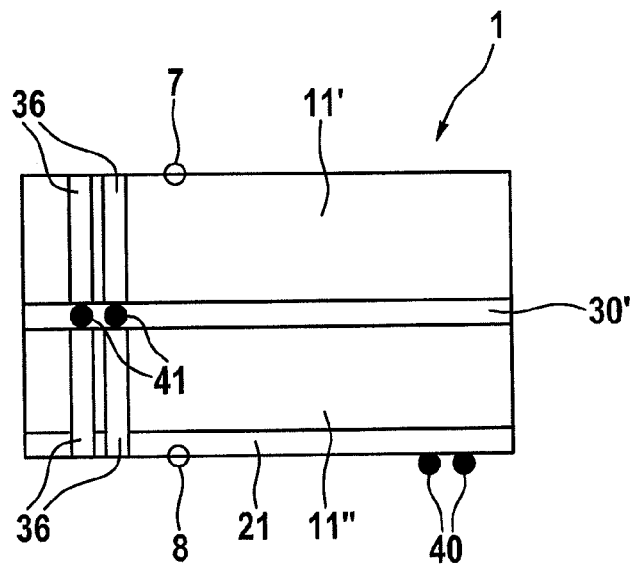
FIG. 4 shows a seventh specific embodiment of a module according to the present invention.

In the different figures, like parts are always denoted by the same reference symbols and are therefore usually labeled or mentioned only once.

Two modules 1 according to the present invention are represented in FIG. 1, where in a first specific embodiment, the left module has a molded housing 70, and in a second specific embodiment, the right module has a metal housing 71. Modules 1 are normally integrated into a mobile terminal (not shown here), such as, into a cellular phone or tablet. However, laptops, USB sticks or MP3 players may also be understood as mobile terminals. What the two housings 70 and 71 have in common, for example, is that they have an opening. As an alternative, the two housings 70 and 71 may be closed, in particular, completely; that is, in particular, the two housings 70 and 71 have no opening or housing opening. The module 1 integrated into the mobile terminal is preferably positioned in such a manner, that the opening of the housing is situated at the upper surface of the mobile terminal or at least points there. Module 1 is preferably integrated into a device housing of the mobile terminal. Since the mobile terminal generates heat during operation, in particular, due to electronic components in the interior of the mobile terminal, the temperature in the interior of the mobile terminal differs from the temperature of its surroundings. Due to the heat generation of the individual components, a temperature gradient may form along the extension of the mobile terminal and, in particular, over the extension of module 1, as well; that is, a first temperature in a first region 7 of the module differs from a second temperature in a second region 8 of the module. In the first and in the second specific embodiment, module 1 has an upper temperature sensor 10 as a first device for measuring temperature, in order to measure the first temperature. The second temperature in second region 8 is ascertained by a subdevice 20, which includes both a lower temperature sensor and an evaluation device. It is conceivable for the evaluation device to be an ASIC circuit. Upper temperature sensor 10 includes, for example, a temperature detector situated on a substrate material in first region 7. A separating region is situated between upper temperature sensor 10 and the ASIC circuit that includes the lower temperature sensor. In the modules according to the first and the second specific embodiments, the separating region is formed by a layer of adhesive 30. It is conceivable for the distance between the first and the second device for measuring temperature 10 and 20 to be reduced, in order to dimension module 1 in such a manner, that it may be used in nearly every mobile terminal or in at least a multitude of different mobile terminals. For the module 1 of the present invention, it is further provided that the evaluation device 20 be a part of module 1. In the illustrated first and second specific embodiments of module 1, evaluation device 21 receives the measured values or signals necessary for determining the temperature difference via a bonding wire 35, which connects upper temperature sensor 10 to the evaluation device in an electrically conductive manner. In the illustrated first and second specific embodiments, modules 1 are situated on an LGA substrate 72, which may be linked to a circuit board via an interface 40. The information about the temperature difference or an estimation for the ambient temperature may be transmitted via interface 40. After the transmission, the mobile terminal may provide, for example, that the estimated ambient temperature be illustrated on a video screen and made available to the user of the mobile terminal, or that the data in the device be made available for other programs via an interface.

In FIG. 2, module 1 of the present invention is represented in a third specific embodiment having a molded housing 70, and in a fourth specific embodiment having a metal cover 71. In both the third and fourth specific embodiments, module 1 is made up of adhesive 30, which separates subdevice 20 (made up of a second device for measuring temperature and an ASIC circuit) and first device for measuring temperature 10 from each other. In this context, the first region 7 having the first temperature is situated at first device for measuring temperature 10, while the second region 8 having the second temperature is situated on the bottom side of subdevice 20. In this context, subdevice 20 is developed as a flip-chip, whose contacts are situated on the side facing the LGA substrate. Then, communication with first device for measuring temperature 10 takes place indirectly via bonding wire 35 and LGA substrate 72. It is conceivable for the third and fourth specific embodiments of subdevice 20 of module 1 to only have contact points on one side. In this case, as well, contact with the circuit board may be produced with the aid of interface 40.

A fifth and sixth specific embodiment of the module according to the present invention are illustrated in FIG. 3. The two modules have a silicon substrate 11 as a base, and the interface 40 to the circuit board is situated on the bottom side of each module. While the evaluation device or logic circuit 21 in the fifth specific embodiment of module 1 illustrated on the left is positioned on the bottom side of the module, evaluation device or logic circuit 21 in the sixth specific embodiment illustrated on the right is situated at the upper side of module 1. In both the fifth and sixth specific embodiment, the electrically conductive connection is produced by a plated-through hole 36 in these single-chip variants. On one hand, plated-through hole 36 allows the information or measured variables necessary for estimating the ambient temperature to be transmitted to evaluation device or logic circuit 21. On the other hand, further plated-through holes 36 in the specific embodiment on the right are used for transmitting information or measured variables to interface 40; the interface being provided for the communication of module 1 with the mobile terminal. In particular, in the fifth specific embodiment, the first region 7 having the first temperature is situated at the upper side of silicon substrate 11. On the other hand, the second region 8 having the second temperature is situated on the bottom side of evaluation device or logic circuit 21, on the side facing away from silicon substrate 11. In the sixth specific embodiment, the first region 7 having the first temperature is situated at the side facing away from silicon substrate 11, while the second region 8 having the second temperature is situated at the bottom side of silicon substrate 11.

A seventh specific embodiment of module 1 of the present invention is represented in FIG. 4. It is a two-chip variant of module 1. In this specific embodiment, a conductive adhesive 30' is situated between two silicon substrates 11' and 11" in the separating region; in this case, the separating region being formed, for example, by a layer of conductive adhesive 30'. Evaluation device or logic circuit 21 is situated at the bottom side of lower silicon substrate 11. The second region 8 having the second temperature is also situated at the bottom side of evaluation device or logic circuit 21. On the other hand, the first region 7 having the first temperature is located on the upper side of upper silicon substrate 11'. In order that the information or measured values regarding the first temperature are able to reach evaluation device or logic circuit 21, plated-through holes or conductor tracks 36 through the two silicon substrates 11' and 11" are provided. In order that the information is also able to get past the obstacle of the conductive adhesive, point contacts 41 are produced in conductive adhesive 30', which connect conductor tracks 36 of upper silicon substrate 11' to conductor tracks 36 of lower silicon substrate 11" in an electrically conductive manner. Alternatively, a metallic connection, e.g., lead-tin solder, is used instead of conductive adhesive 30'.

Figure 5:
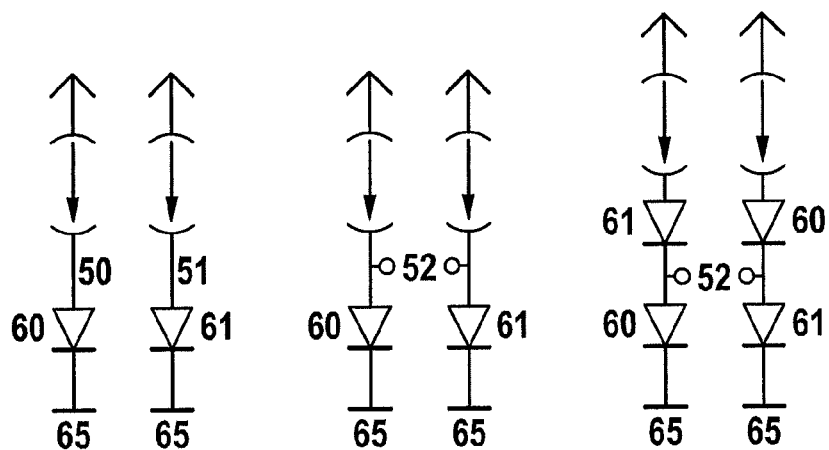
FIG. 5 shows different circuits for an evaluation device situated in the module, which are implementable in principle.

Three different circuits, which may be implemented, in principle, with a module of the present invention, are represented in FIG. 5. The circuit drawings each include a first temperature sensor 60 in the form of a first diode and a second temperature sensor 61 in the form of a second diode. In an alternative specific embodiment, a temperature-dependent resistor or another temperature-sensitive electrical component may optionally be used, as well, for determining temperature. In the circuit drawing on the left, a first voltage U1 50, which drops across the first temperature sensor, and a second voltage U2 50, which drops across the second temperature sensor, are measured in two independent circuits. Temperature difference dT is then ascertained in view of a proportionality constant C, in accordance with dT=C*(U2−U1). In a second circuit variant, potential difference dU 52 is measured differentially, that is, the voltage, which drops altogether across first and second temperature diodes 60 and 61, is measured, if the inputs and/or the outputs of the temperature diodes share a potential 65 (e.g., since both inputs or both outputs are grounded). The temperature difference is then determined using dT=C*dU. In an expanded circuit variant illustrated on the right, the circuit includes, for amplification, a measuring bridge made up of a further first and a further second temperature sensor 60 and 61.

Figure 6:
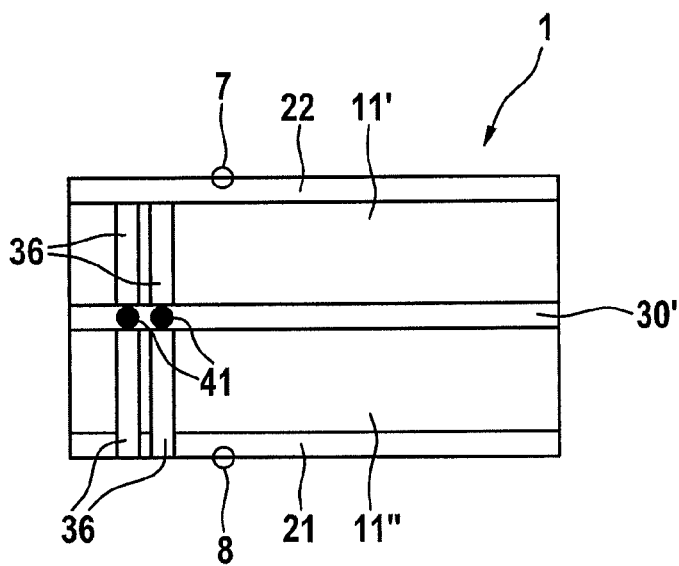
FIG. 6 shows an eighth specific embodiment of a module according to the present invention.

A module according to an eighth specific embodiment is illustrated in FIG. 6. The illustrated module includes a conductive adhesive 30', which is situated between lower silicon substrate 11" and upper silicon substrate 11'. An evaluation device or logic circuit 21 and 22 is situated, in each instance, at the upper side of upper silicon substrate 11' and at the bottom side of lower silicon substrate 11". In this specific embodiment, it is provided that the first region 7 having the first temperature be situated on the upper side of the module and the second region 8 having the second temperature be situated on the bottom side of the module. Since, in each instance, an evaluation device or logic circuit 21 and 22 is situated in both the first region and the second region, it is possible to ascertain the first temperature and the second temperature in, in each instance, an independent evaluation device or logic circuit 21 and 22. Plated-through holes 36 of upper and lower silicon substrates 11', 11" are used for communication between the independent evaluation devices. In order to get past conductive adhesive 30', point contacts 41, which connect plated-through hole 36 of lower silicon substrate 11" to that of upper silicon substrate 11' in an electrically conductive manner, are produced in the conductive adhesive 30' between upper and lower silicon substrates 11' and 11". Alternatively, a metallic connection, e.g., lead-tin solder, is used instead of conductive adhesive 30'.

What is claimed is:

1. A module for integration into a mobile terminal, in order to estimate the ambient temperature, the module comprising:
    a first device for measuring a first temperature in a first region;
    a second device for measuring a second temperature in a second region;
    an evaluation device configured to ascertain a temperature difference between the first temperature in the first region and the second temperature in the second region, in order to estimate the ambient temperature;
    a housing within which the first device, the second device, and the evaluation device are situated;
    wherein the first device, the second device, the evaluation device, and the housing, together, form a single module; and
    a substrate upon which the single module is mounted, the substrate including an interface for contacting a circuit board of the mobile terminal, at least one of the temperature difference and the estimate of the ambient temperature being transmitted to the circuit board via the interface;
    wherein the evaluation device is configured to estimate the ambient temperature as a function of the ascertained temperature difference;
    wherein the evaluation device is situated in the second region;
    wherein the first region and the second region are interconnected via an electrically conductive connection;
    wherein a separating region is situated between the first and second devices;
    wherein the housing has an opening on at least one side; and
    wherein the opening in the housing is situated at an upper surface of the mobile terminal.

2. The module as recited in claim 1, wherein the separating region is formed by one of an adhesive or a conductive adhesive.

3. The module as recited in claim 1, wherein the first region and the second region are situated on opposite sides of the module.

4. The module as recited in claim 1, wherein a further evaluation device is situated in the first region.

5. The module as recited in claim 1, wherein the electrically conductive connection is produced by a bonding wire.

6. The module as recited in claim 1, wherein:
    the first device for measuring temperature includes at least one of a temperature-dependent resistor, a temperature-measuring diode, and a temperature-sensitive electrical component; and
    the second device for measuring temperature includes at least one of a temperature-dependent resistor, a temperature-measuring diode, and a temperature-sensitive electrical component.

7. The module as recited in claim 1, wherein the substrate is an LGA substrate.

* * * * *